United States Patent

[11] 3,579,194

[72] Inventor Herbert B. Weinblatt
Cambridge, Mass.
[21] Appl. No. 757,315
[22] Filed Sept. 4, 1968
[45] Patented May 18, 1971
[73] Assignee Bell Telephone Laboratories, Incorporated
Murray Hill, Berkeley Heights, N.J.

[54] PROCESS FOR DETERMINING THE SIMPLE CYCLES OF A FINITE DIRECTED GRAPH
8 Claims, 11 Drawing Figs.

[52] U.S. Cl. .......... 340/172.5,
340/172.5
[51] Int. Cl. .......... G06f 7/00
[50] Field of Search .......... 340/172.5;
235/157

[56] References Cited
OTHER REFERENCES

William H. Huggins, " Flow Graph Representation of Systems" 1962 pp. 609— 621.
T. R. Bashkow " Network Analysis" 1963 pp. 280— 290.

*Primary Examiner*—Paul J. Henon
*Assistant Examiner*—R. F. Chapuran
*Attorneys*—R. J. Guenther and Kenneth B. Hamlin

ABSTRACT: A machine process based on an algorithm for finding the simple cycles of a finite directed graph wherein each arc of the graph is examined once and only once. Simple cycles are found either when the path of the graph being examined is found to be cyclic or when parts of previously found cycles can be combined with a portion of the path then being examined to form cycles. A general purpose computer program for implementing the algorithm is described.

INVENTOR
H. B. WEINBLATT
BY RC Lipton
ATTORNEY

| | | | | | |
|---|---|---|---|---|---|
| 21. | 46,48,50,52,54,58,62,60 | b | | | befcdb= $c_4$ |
| 22. | 38,44,46 | b | $C_2$ | VOID | |
| 23. | 38,40,42 | b | | | |
| 24. | 38,44 | b | $C_3$ | $f_g$ | |
| 25. | 46,48,50,52,56 | b | | | |
| 26. | 34,36,38,44 | b | $C_2$ | efc | |
| 27. | 46,48,50 | b | | | |
| 28. | 38,44 | b | $C_3$ | VOID | |
| 29. | 46 | b | | | |
| 30. | 38,40,42 | b | | | |
| 31. | 38,40 | b | | | |
| 32. | 20,24,30 | EMPTY | | | |
| 33. | 12,14 | PROCESS TERMINATED | | | |

FIG. 4A

| | STEPS OF ALGORITHM | STATUS OF TRIAL THREAD LIST TT | C P CHOSEN | CYCLE TAIL | CYCLIC PATHS FOUND |
|---|---|---|---|---|---|
| 1. | 2,4 | VERTEX a AND ARC ab ELIMINATED | | | |
| 2. | 2,6,8 | VERTEX h AND ARC gh ELIMINATED | | | |
| 3. | 6,12,16,18 | b | | | |
| 4. | 20,22,26,18 | b c | | | |
| 5. | 20,22,26,18 | b c d | | | |
| 6. | 20,22,26,28 | b c d (b) | | | bcdb= $C_1$ |
| 7. | 20,22,26,18 | b c d g | | | |
| 8. | 20,22,26,18 | b c d g e | | | |
| 9. | 20,22,26,18 | b c d g e f | | | |
| 10. | 20,22,26,28 | b c d g e f (c) | | | cdgefc= $C_2$ |
| 11. | 20,22,26,28 | b c d g e f (g) | | | gefg= $C_3$ |
| 12. | 20,24 | b c d g e | | | |
| 13. | 30,20,24 | b c d g | | | |
| 14. | 30,20,24 | b c d | | | |
| 15. | 30,20,24 | b c | | | |
| 16. | 30,20,24 | b | | | |
| 17. | 30,20,22,26,32 | b(e) | | | |
| 18. | 34,36,38,44 | b | $C_2$ | $f_c$ | |
| 19. | 46,48,50,52,56 | b | | | |
| 20. | 34,36,38,44 | b | $C_1$ | db | |

FIG. 5A

```
*
*       DELØØP, NULØØP AND CØNCAT HAVE BEEN DESCRIBED IN A MEMØ
*       NØTE, HØWEVER, THAT "BSL" IS USED HERE INSTEAD ØF "TT"
*       AND, "LØØP" INSTEAD ØF "CYCLE"
*
*       "Y" INDICATES A NØDE WHICH HAS ALREADY BEEN ENCØUNTERD
*       "Z" INDICATES ØNE WHICH IS NØ LØNGER ØN THE BSL
*
LØØPX   ENTRYQ *LØPC* *NU* *ENQ*                                              27
LPD     ENQ *BSL* *LR* ",' =          /F(RETURN)                              28
        LE = LR                                                               29
LPB     $LR *LR/"3"* "," ** "$" *LE/"3"*             /F(BACA)                 30
        $LE = "Y" $LE                                                         31
        BSL = "," LE BSL                                                      32
LPC     $LR ANCHØR() "Y"                              /F(LPB)                 33
        NULØØP(LR)                                                            34
BAKDLP  $LE LR "," *LR/"3"* ","                       /S(LPC)                 35
        LR = LE                                                               36
        BSL */"5"* *LE/"3"* = "," LE                  /F(LPD)                 37
BACA    $LR = "YZ" $LR                                /(BAKDLP)               38
*
*       NULØØP
*
NLØPX   $LV ANCHØR() */"1"* "Z" ** "*" *LVLØPS* "+"        /F(NLPA)           39
        RECUR =                                                               40
        NLPS CØNCAT(LV,LVLØPS,) =                     /(RETURN)               41
*
*       A SIMPLE NEW LØØP HAS BEEN FØUND -- FØRM IT
*
NLPA    BSL *INX* LV INCR("LØPC")                     /F(ERRØR)               42
        $("L" LØPC) = LV INX LV                                               43
        SYSPØT = "L" LØPC "=" $("L" LØPC)                                     44
LPREFX  $LV "*" = "*L" LØPC ","                       /F(ERRØR)               45
*
```

FIG. 5B

```
*       INSERT REFERENCES TØ THE NEW LØØP FRØM ALL ITS VERTICES
*
        INX */"1"* =                                                   46
LPNØ    INX *LNØD* ",", =                      /F(RETURN)              47
        $LNØD "*" = "*L" LØPC ","              /S(LPNØ)F(ERRØR)        48
*
*       CØNCAT
*       CØNCATENATES LØØP TAILS TØ FIND MØRE CØMPLEX LØØPS
*
*       FIND LØØPS CØNTAINING JPT AND NØT TERMINATING ØN TAIL
*
CØNCY   LTLIST = "$"                                                   49
        TAIL *LVT/"3"*                                                 50
CØNCX   LØPNØS *LØPNØ* ",", =                  /F(RETURN)              51
        $LØPNØ *LTAIL* LVT                     /F(ERRØR)               52
*
*       MAKE SURE LTAIL IS NEW
*
        EQUALS (LTAIL)                         /S(CØNCX)               53
        LTLIST "$" LTAIL "$"                   /S(CØNCX)               54
        LTLIST = LTLIST LTAIL "$"                                      55
*
*       MAKE SURE LTAIL AND TAIL DØNT INTERSECT
*
        .GT(SIZE(TAIL),SIZE(LTAIL))        /F(CØNCD)                   56
        TEMP = LTAIL                                                   57
CØNCE   TEMP *NV/"3"* ",", =        /F(CØNCC)                          58
        TAIL NV                     /S(CØNCX)F(CØNCE)                  59
CØNCD   TEMP = TAIL                                                    60
```

FIG. 5C

```
CØNCF   TEMP *NV/"3"* ","  =           /F(CØNCG)                          61
        LTAIL NV                       /S(CØNCX)F(CØNCF)                  62
CØNCG   LTAIL TEMP                                       /S(CØNCX)        63
CØNCC   LTAIL *LVL/"3"* *INX*                                             64
        $LVL ANCHØR() */"1"* "Z" ** "*" *LVLØPS* "+"     /F(CØNCB)        65
*
*       LVLIS NØ LØNGER ØN BSL -- TRY EXTENDING THE TAIL FURTHER
*
CØNCA   RECUR = "1"                                                       66
        CØNCAT((LTAIL TAIL),LVLØPS,)   /(CØNCX)                           67
*
*       LVLIS ØN THE BSL -- FØRM THE NEWLY FØUND LØØP
*
CØNCB   BSL *BTAIL* LVL INCR("LØPC")           /F(ERRØR)                  68
        INX = INX TAIL BTAIL                                              69
        $("L" LØPC) = LVL INX LVL                                         70
*
*       CHECK WHETHER THIS LØØP HAS BEEN PREVIØUSLY FØUND
*       THIS CAN ØNLY BE SØ IF CØNCAT HAS BEEN CALLED RECURSIVELY
*       SINCE THE LAST TIME IT WAS CALLED BY NULØØP
*
        NLPS UNEQL(RECUR) "$" $("L" LØPC)                /S(CØNCH)        71
        SYSPØT = "L" LØPC "=" $("L" LØPC)                                 72
        NLPS = NLPS "$" $("L" LØPC) LPREFS(LVL)          /(CØNCX)         73
CØNCH   $("L" LØPC) =                                                     74
        DECR("LØPC")                                     /(CØNCX)         75
*
*       IMAGE
```

PROCESS FOR DETERMINING THE SIMPLE CYCLES OF A FINITE DIRECTED GRAPH

BACKGROUND OF THE INVENTION

1. Field of the Invention

This invention relates to machine processes for analyzing graphs and more particularly, to a method for operating a machine, such as a digital computer, in accordance with an algorithm for analyzing graphs.

2. Description of the Prior Art

The following are basic definitions necessary for understanding the background of the present invention and the invention itself.

a. Directed Graph—A set of points or vertices together with a set of directed line segments or arcs arranged such that each arc connects precisely two vertices. An arc is said to be directed from vertex 1 to vertex 2 when the arc "originates" on vertex 1 and "terminates" on vertex 2.

b. Path—A path connecting one vertex, $v_0$, to another vertex, $v_n$, is an ordered collection of arcs $a_1a_2...a_n$ such that arc $a_1$ originates on vertex $v_0$ and terminates on vertex $v_1$, each of the other arcs originates on the vertex on which the preceding arc terminates, and arc $a_n$ terminates on vertex $v_n$. A path may also be represented by including the vertices as part of the path such as $v_0a_1v_1a_2...v_{n11}a_nv_n$. If no pair of vertices are connected by more than a single arc, then the path may be represented by including only the vertices such as $v_0v_1v_2...v_{n11}v_n$.

c. Cyclic Path—A path which originates and terminates on the same vertex.

d. Cycle—The arcs and vertices of a cyclic path without regard to its end points form a cycle (termed a "loop" in programming terminology). For example, the two cyclic paths $v_1a_{22}a_1v_1$ and $v_2a_1v_1a_2v_2$ both correspond to the same cycle.

e. Simple Cyclic Path—A path which encounters one vertex twice (the one on which it originates and terminates) and no other vertex more than once.

f. Simple Cycle A cycle which corresponds to a simple cyclic path.

g. Branch Point—A vertex on which two or more arcs originate.

h. Terminal Subpath—Any portion of a path which represents the termination of that path. For example, $v_1a_2v_2$ is a terminal subpath of the path $v_0a_1v_1a_2v_2$.

i. Tail of a Simple Path With Respect to a Vertex—That portion of a path from but excluding the vertex in question to and including the terminal vertex. To illustrate, the tail of the simple path $v_0a_1v_1a_2v_2$ with respect to $v_1$ is $a_2v_2$.

Graph theory has been applied to a variety of disciplines including network analysis and computer program analysis. In general, graph theory is applicable to any discipline in which flow diagrams or flow charts are utilized. See Berge, C., THE THEORY OF GRAPHS AND ITS APPLICATIONS, John Wiley and Sons, New York, 1962. In many applications of graph theory, it is desired to obtain a list of the simple cycles of the graph. Finding of such cycles is useful for (a) aiding in the segmentation of computer programs and in other program analysis (See Allen, F. E., "Program Optimization," Research Report RC-1959, IBM Watson Research Center, Yorktown Heights, N.Y., Apr. 26, 1966; and Hamburger, P., "On an Automatic Method of Symbolically Analyzing Times of Computer Programs," Proc. of the 21st. Nat'l. Conf. of the ACM, pp. 321—330, 1966.) and, (b) in aiding in breaking the feedback paths of a control system, a computer program, etc. (See Ramamoorthy, C. V., "A Structural Theory of Machine Diagnosis," AFIPS Conference Proceedings, Volume 30, pages 743—756 [Spring, 1967]).

One approach in finding the simple cycles of a directed graph would simply be to examine all paths of the graph until all simple cycles were obtained. Algorithms or methods for examining the paths of a graph, however, usually contain no provisions for preventing the examination of a path more than once. Lack of such provisions could, of course, increase the time necessary to find all simple cycles of a graph.

SUMMARY OF THE INVENTION

It is an object of this invention to find the simple cycles of a finite directed graph wherein each arc of the graph is examined once and only once.

Another object of the present invention is to provide an algorithm or method for finding such cycles which is intended to be implemented on a data processing machine such as a general purpose computer.

These and other objects of the present invention are realized in a specific illustrative algorithm in which the paths of a graph are examined and the cycles determined either (a) when the path of the graph being examined is found to be cyclic or (b) when parts of previously determined cycles can be combined with a portion of the path then being examined to form cycles. This algorithm which will be described in detail hereafter may be programmed to operate on a general purpose computer.

In the discussion of this algorithm, reference will be made to various elements of a graph such as vertices and arcs. In making such reference it is understood that such elements would be represented by electrical signals of one kind or another in the implementation of the algorithm on a general purpose computer. Thus, for example, when discussing "searching a path" of a graph, it should be understood that this means examining stored data which represents the graph. The invention is described in these terms for clarity and because such terms are familiar to persons who might implement the algorithm on a general purpose computer, i.e., programmers.

The first step of the algorithm is to examine all the vertices of the graph and then repeatedly remove from the graph those vertices on which arcs do not both originate and terminate and those arcs, if any, terminating or originating thereon. The next step of the algorithm is to select one of the remaining vertices as a "starting point" and examine one of the paths emanating therefrom. Each vertex and arc encountered in the examination of this path is marked (indicating that the vertex and arc has been examined) and a representation thereof is placed in storage in a so-called trail thread list. The trial thread list represents a path through the graph from the "starting point" to the element which is currently being examined. When a vertex is encountered which has been previously examined and that vertex is still on the trail thread list then a cycle has been found. This cycle consists of the reencountered vertex together with the tail of the trail thread list with respect to this vertex. A representation of this cycle is then placed in a cyclic path list.

After a cycle is found, the direction of searching or examination is reversed and the trial thread list reexamined until a branch point is reencountered which contains an arc which has not been examined. The unexamined path emanating from such a branch point is then examined as above. If no such branch point is reencountered during the reexamination of the trail thread list, then a new vertex which has not yet been examined (if one exists) is selected as a new "starting point" and the above procedure is carried out.

When, during searching, a vertex is reencountered which is no longer on the trail thread list because it has been removed during re-searching, then a recursive procedure is initiated. This procedure consists of concatenating or linking terminal subpaths of previously discovered cycles at least one of which contains the reencountered vertex to form paths which originate at the reencountered vertex and terminate at a vertex which is still on the trail thread list. For each such path found, a new cycle is formed by concatenating the path with the tail of the trail thread list with respect to the vertex on which said path terminates.

A short example of the concatenating procedure will now be given. Assume that cycles $v_1a_2v_2a_1v_1$ and $v_2a_3v_3a_4v_2$ have been found and placed in a cycle list and that vertex $v_3$ has been reencountered. Also assume that the trail thread list consists of $v_1a_5v_3$. By concatenating the trail thread list with subpath $a_4v_2$ of the second cycle named above and subpath $a_1v_1$ of the first cycle named above, a new cycle $v_1a_5v_3a_4v_2a_1v_1$ is formed.

BRIEF DESCRIPTION OF THE DRAWINGS

A complete understanding of the present invention and of the above and other advantages thereof may be gained from a consideration of the following detailed description of an illustrative showing thereof presented hereinbelow in connection with the accompanying drawings in which:

FIG. 3 shows an illustrative finite directed graph;

FIGS. 4A and 4B with FIG. 4A placed on top of FIG. 4B show the steps in analyzing the graph of FIG. 3 in accordance with the present invention; and FIGS. 5A, 5B and 5C show an illustrative computer program for implementing the algorithm represented in FIGS. 1A through 1D.

DETAILED DESCRIPTION

Figure 1A:
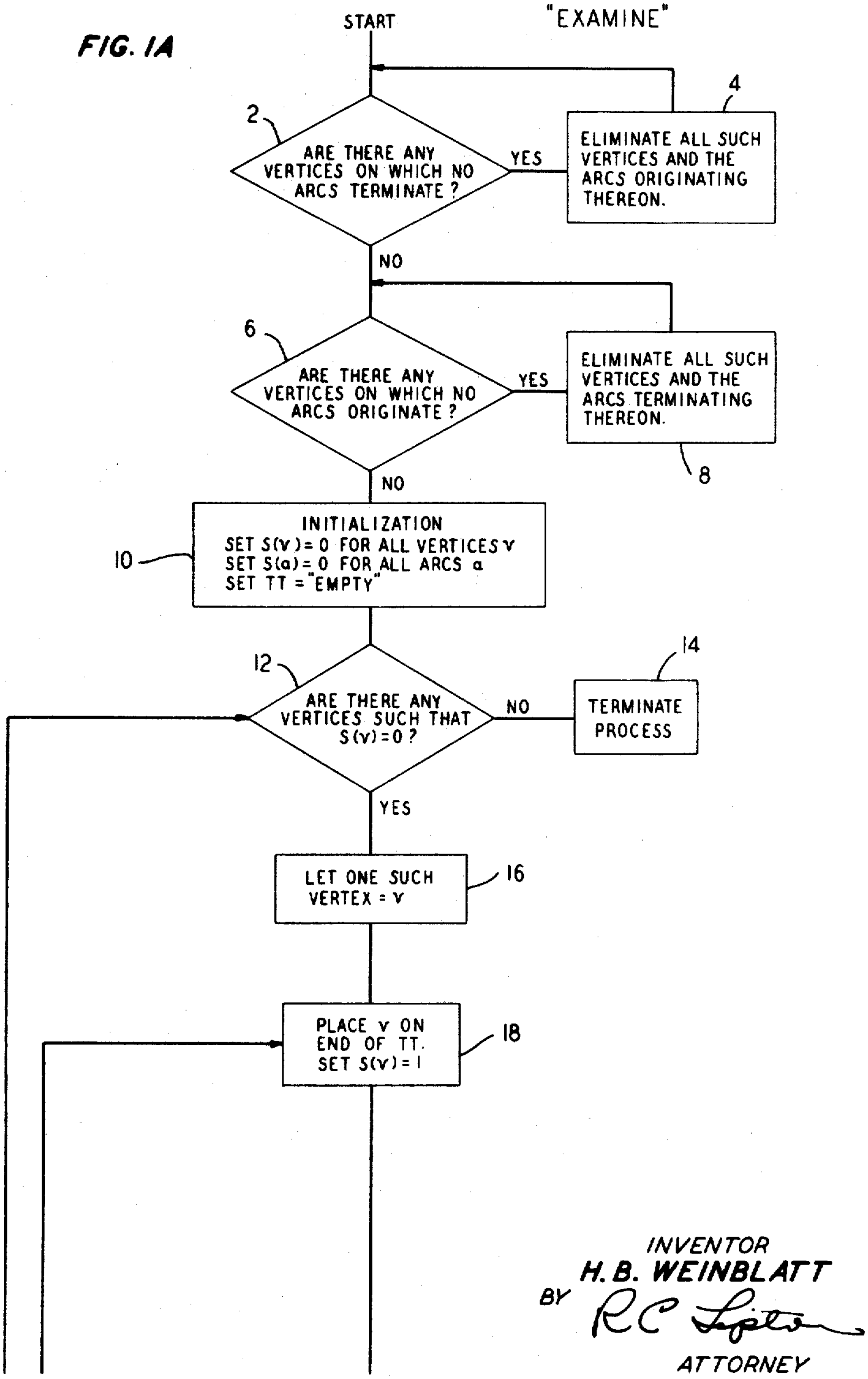
FIGS. 1A, 1B, 1C, and 1D are flow diagrams representing a specific illustrative machine algorithm for practicing data processing in accordance with the present invention.

Before discussing the drawings, certain symbolic representations which are used in the drawings will be defined. The representation END(P) indicates the end of a path P. The symbol $S(a)$ represents the state of an arc and is a two valued function which specifies whether or not the arc $a$ has been on the trail thread list TT. When $S(a)=0$, this indicates that the arc $a$ has never been on the trail thread list TT. When $S(a)=2$, this indicates that the arc has been (and may still be) on the trail thread list TT. The symbol $S(v)$ represents the state of a vertex and is a three-valued function. $S(v)=0$ indicates that the vertex $v$ has never been on the trail thread list. $S(v)=1$ indicates that the vertex $v$ is now on the trail thread list. Finally, $S(v)=2$ represents that the vertex $v$ has been on the trail thread list but has since been removed. The tail of a simple path P with respect to a vertex $v$ is represented by TAIL $(P,v)$.

The algorithm of FIGS. 1A through 1D will be discussed in terms of the formation of cyclic paths rather than cycles per se. Of course, every cyclic path is a cycle but in addition, a cyclic path has a specific initial and terminal vertex. Further, in representing the trail thread list TT, only vertices will be enumerated. Such enumeration accurately represents paths of a graph as long as there are no parallel arcs between any two of the vertices of the graph (which is the case of most interest). Arcs will still be considered as having been placed on the trail thread list if the two vertices connected by such arcs have been placed thereon.

Any graph to which the algorithm of FIGS. 1A through 1D would be applied in a data processing system or computer would be represented in that data processing system or computer by stored electrical signals. That is, the identity of each vertex of the graph is stored in memory along with the identity of the arcs originating on each vertex and the vertices on which such arcs terminate. This information or data defining the graph would, of course, be fed into the data processing system or computer prior to beginning analysis of the graph by the computer. The functions $S(a)$ and $S(v)$ are associated with each arc and each vertex of the graph respectively in the memory.

Figure 1B:
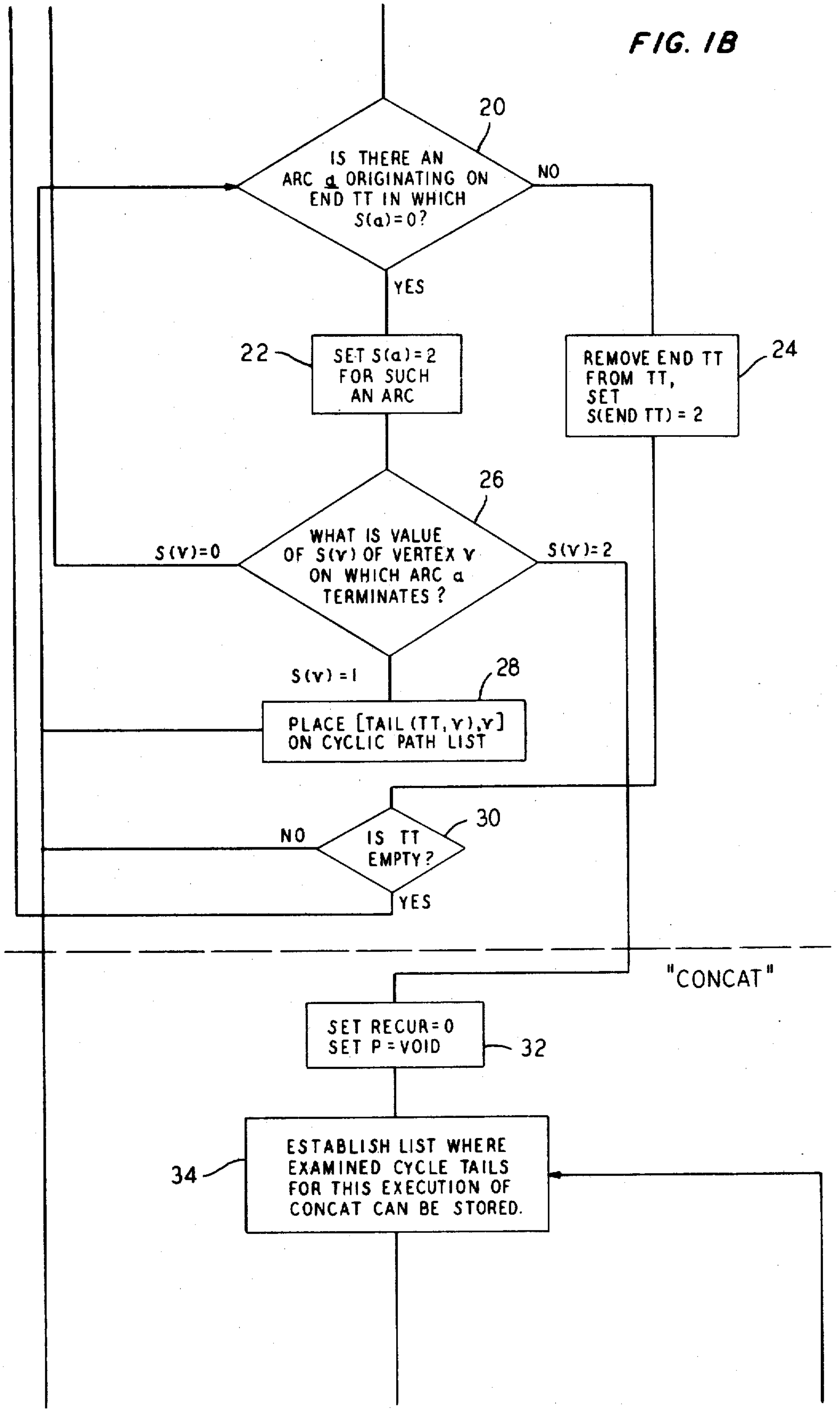
Figure 1C:
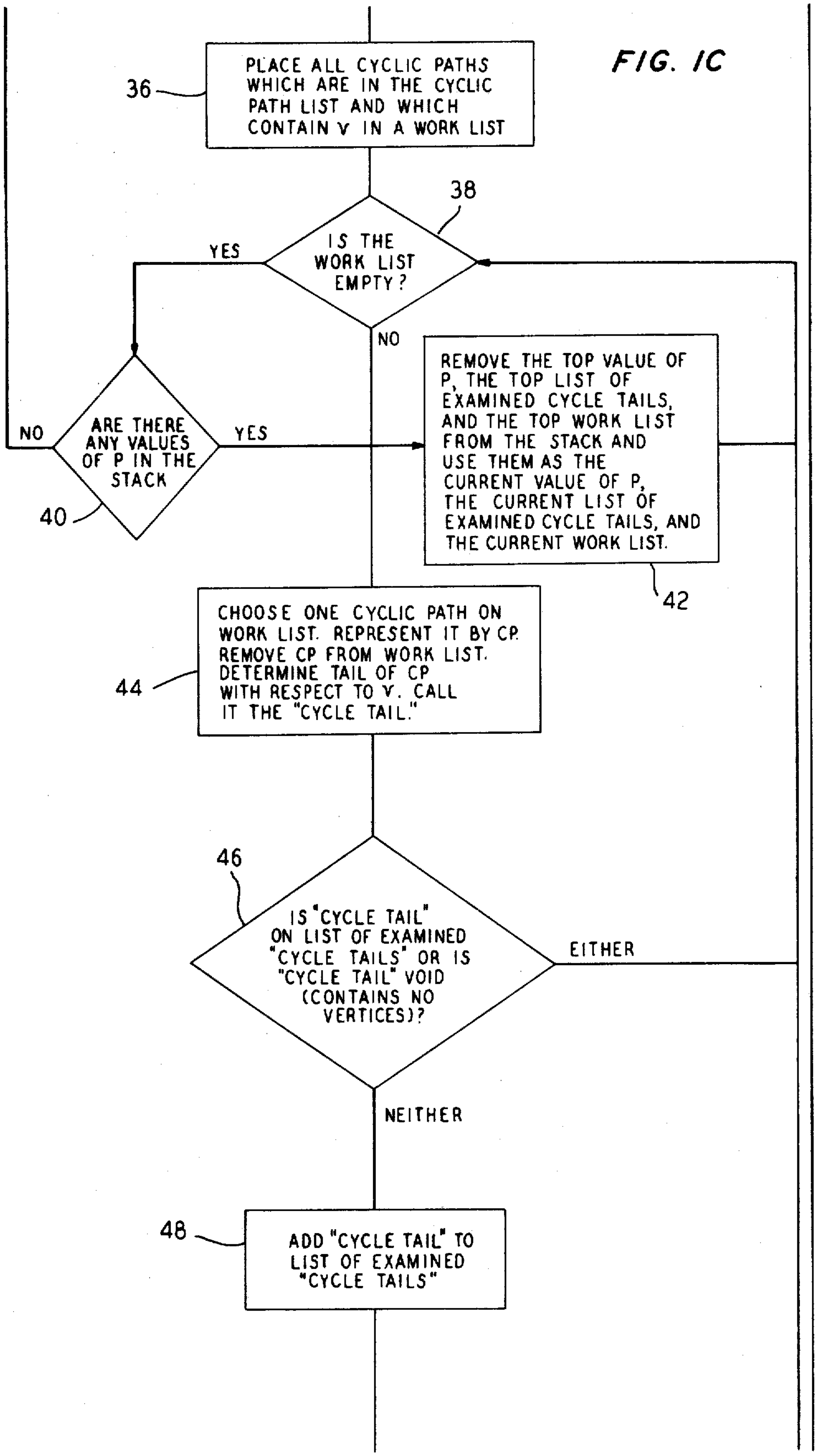
Figure 1D:
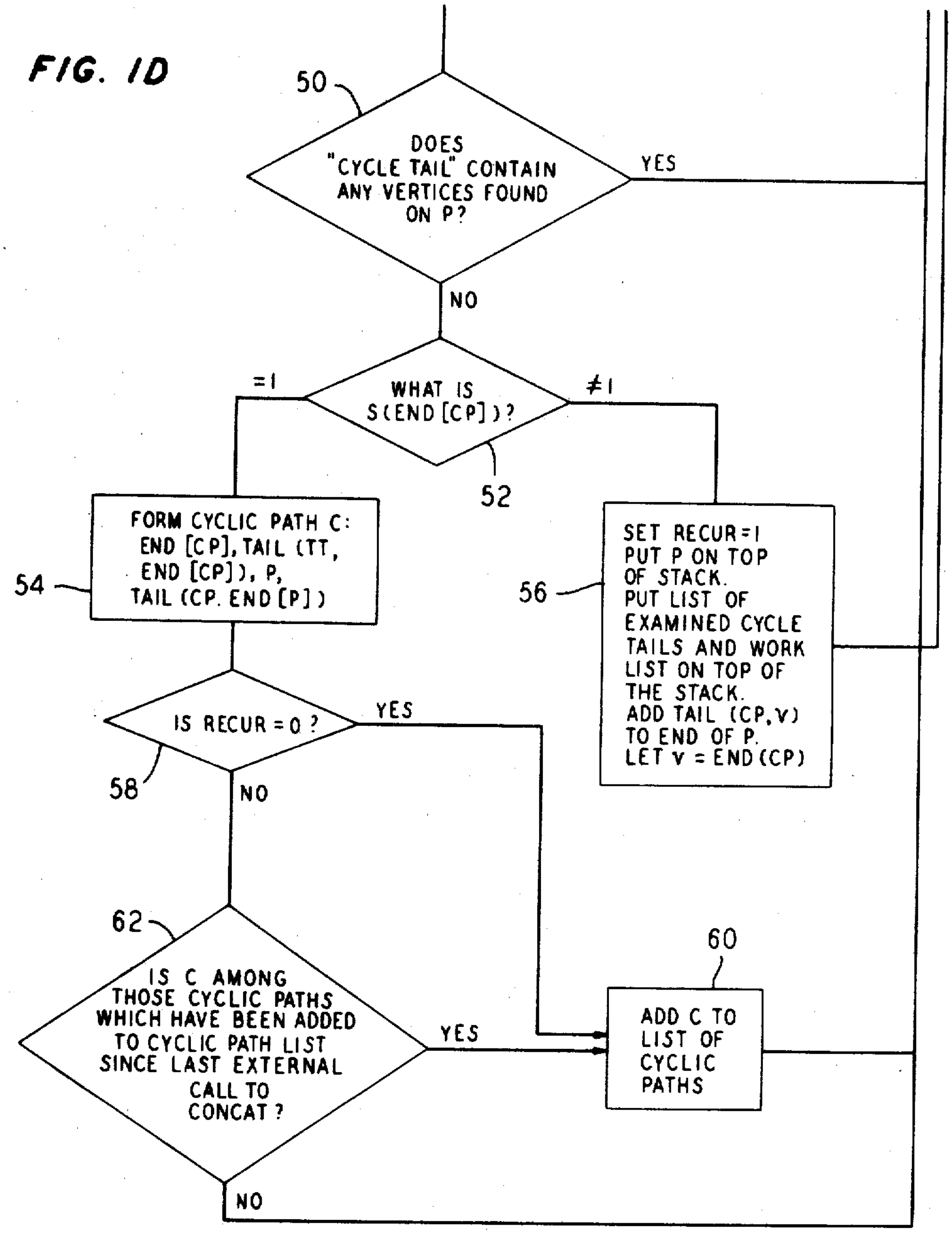
Figure 2:
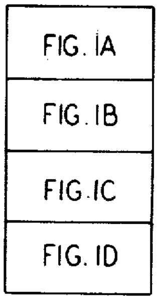
FIG. 2 shows the positioning of FIGS. 1A through 1D with respect to each other.

The algorithm of FIGS. 1A through 1D may be broadly broken down into two parts, one part called "examine" consisting of blocks 2 through 30 of FIGS. 1A and 1B and the other part, a recursive subroutine, called "concat" consisting of blocks 32 through 62 of FIGS. 1B through 1D. Cyclic paths may be discovered in either part of the algorithm as will be discussed later on. Any cyclic path which is discovered during a recursive execution of "concat" must be compared with any other cyclic paths which have been discovered since the last so-called external call to cancat—that is, since the last entry from "examine" into "concat"—in order to determine whether the path has already been found. Because of this required comparison, it is necessary to maintain an indication of whether "concat" has been called externally (i.e., has been entered from "examine") or whether it has been called recursively (i.e., "concat" reentered from "concat"). A variable which will be called "Recur" is set to 0 whenever "concat" is called externally and is set to 1 whenever it is called recursively.

Referring now to FIG. 1A, there are shown the initial steps of the algorithm for finding the simple cycles of a finite directed graph. The first step specifically as indicated in blocks 2 and 4 is to eliminate all vertices on which no arcs terminate and all arcs originating thereon. The second step of the algorithm as indicated by blocks 6 and 8 is to eliminate all vertices on which no arcs originate and all arcs terminating thereon. The next step as indicated by block 10 is the "initialization" in which the variables $S(v)$ and $S(a)$ for each vertex and arc remaining on the graph is set to 0. An "empty" indication is also placed in the trail thread list TT. The vertices of the graph are then examined to determine if any function $S(v)$ of any of the vertices is equal to 0; that is, if any of the vertices have not been on the trail thread list. Of course, at this stage of the algorithm, having just gone through the "initialization" step, there would be such vertices assuming that any vertices remained on the graph. If the algorithm were returning to this step from a later step in the algorithm, i.e., specifically from the step specified in block 30 of FIG. 1B, then there may not be any vertex which has not yet been on the trail thread list, in which case the process would terminate as indicated by block 14. Assuming that one such vertex does exist, the nest step of the algorithm is to identify the vertex as $v$. The vertex $v$ is then placed on the trail thread list TT and the function $S(v)$ is set equal to 1 (see block 18). The vertex $v$ or END TT is then examined to determine if there exists an arc $a$ originating thereon in which $S(a)$ is equal to 0. If not, END TT is removed from the trail thread list TT and S(END TT) is set equal to 2 as indicated in block 24. The algorithm then advances to block 30 where the trail thread list TT is examined to determine if it is "empty." If so, the algorithm returns to block 12. If not, the algorithm returns to block 20 from which the algorithm has just come. If there exists an arc originating on END TT in which $S(a)$ is equal to 0, then one such arc, $a$, is selected and $S(a)$ is set equal to 2 (block 22) and the algorithm moves on to block 26. The value of the function $S(v)$ of the vertex $v$ on which the arc $a$ terminates is then examined. If the value is 0 the algorithm returns to block 18, whereas if the value is 1 the algorithm moves on to block 28. In the latter case, a cyclic path or cycle consisting of TAIL (TT, $v$) and $v$ has been found and is placed in the cyclic path list as indicated by block 28 after which the algorithm returns to block 20. The part of the algorithm discussed thus far comprises what was referred to earlier as "examine." A cycle is found in "examine" each time the step included in block 28 is concluded. The remainder of the algorithm comprises what was referred to earlier as "concat."

The "concat" portion of the algorithm is entered if it is determined that the value of $S(v)$ of the vertex $v$ on which the arc $a$ terminates is equal to 2. In this case, the variable "Recur" is set to 0 indicating that "concat" has been entered externally that is from "examine." In addition, a variable P is set to "void" as indicated in block 32. The variable P represents or will represent the path composed of portions of already found cycles which are currently being examined by the algorithm in an attempt to form new cycles. These portions will have been concatenated or linked together to form the path P.

The next step of the algorithm is to establish a list where examined cycle tails for this particular execution of "concat" can be stored. That is, a portion of memory is set aside where examined cycle tails may be stored. All cyclic paths which are in the cyclic path list and which contain the vertex $v$ (the vertex on which the arc $a$ terminates) are then placed in a work list as indicated by block 36. The work list is then examined to determine whether it contains any cyclic paths. If there is a cyclic path in the work list, then one such cyclic path is selected. The path (represented by CP) is then removed from the work list (block 44). The tail of this cyclic path with respect to *v* is then determined and for reference purposes we will refer to this tail as the "cycle tail." If the "cycle tail" is either on the list of examined "cycle tails" or is void (contains no vertices), then the algorithm is directed back to block 38. If, on the other hand, the "cycle tail" is neither on the list of examined "cycle tails" nor is void, then the "cycle tail" is added to the list of examined "cycle tails" (blocks 46 and 48). The "cycle tail" is then examined to determine whether or not it contains any vertices found on the path P currently being examined (block 50). Since this portion of "concat" is being discussed as though having just been entered from "examine" and since P was set to void, there is no path P which has been built up from linking portions of other cyclic paths together as will be discussed later on. Therefore the "cycle tail" would not at this stage contain any vertices found on P. However, assume that we are at this stage having entered "concat" from itself. Then, the "cycle tail" might contain vertices found on P and the answer to the question posed in block 50 would be "yes" and the algorithm would go back to block 38. If on the other hand the "cycle tail" does not contain any vertices found on P then the algorithm moves on to block 52 where the function S(END[CP] is examined to determine its value. If its value is 1, then a new cyclic path is formed (block 54) by concatenating or linking END[CP], TAIL (TT, END[CP]), P, TAIL (CP, END[P]) together. The variable "Recur" is then examined to determine its value. If "Recur" is equal to 0, then the cyclic path formed in block 54 is added to the list of cyclic paths and the algorithm returns to block 38. If the value of "Recur" is not equal to 0, then, as indicated in block 62, it is determined whether the cyclic path C formed in block 54 is among those cyclic paths which have been added to the cyclic path list since the last external call to concat. If it is not, then C is added to the list of cyclic paths and the algorithm returns to block 38. On the other hand, if C is among such cyclic paths, then the algorithm returns to block 38 and C, of course, is not added to the list of cyclic paths.

Returning now to block 52 where the value of the function S(END[CP] was examined, if it is determined that this value is not equal to 1 (i.e., is equal to 0 or 2), then the variable "Recur" is set equal to 1 indicating that "concat" has been entered from itself rather than from "examine," the path P which may consist only of the vertex *v* if "concat" has just been entered is placed on top of a so-called stack (to be explained), the list of examined cycle tails and the work list is placed on top of the stack, *v* is set equal to END(CP), and the tail of the cycle path CP with respect to the vertex *v* is added to the end of the path P currently being examined. The stack is simply a list or a record where the current work product of the "concat" procedure is placed when the algorithm is about to begin the "concat" procedure again, i.e., when "concat" calls itself. In other words, when the algorithm is about to terminate the "concat" procedure to begin another and new "concat" operation, it sets aside in a stack what is currently being worked on. Such things as the path P which has been built up to that point, the examined cycle tails and the work list is placed on the stack. This concludes examination of the "concat" procedure which may take place if the answer to the question set forth in block 38 is "no."

Returning now to block 38, if it is determined that the work list is empty, that is, that it does not contain any cyclic paths, then the algorithm moves on to block 40 where the stack is examined to determine if it contains any values of P. If there are none, then the algorithm returns to block 20. If, on the other hand, there is a value of P in the stack, then the top value of P plus the top list of examined cycle tails and the top work list are removed from the stack and utilized as the current value of P, the current list of examined cycle tails and the current work list (as indicated in block 42). The work list which was just removed from the stack is then examined again in accordance with block 38.

In the manner described above, all cycles of a finite directed graph may be determined. The cycles are found either during the "examine" part of the algorithm or during the "concat" part. The arcs of the graph are examined once and only once in the process of finding the cycles (excluding the so-called researching or reexamining of paths which is simply a "backing up" of the algorithm).

Figures 3, 4B:
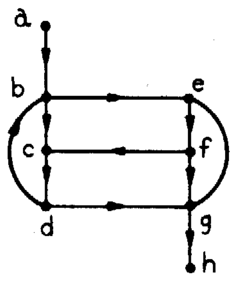

An example showing application of the algorithm to a simple graph will now be given. The graph to which the algorithm will be applied is shown in FIG. 3. The vertices of the graph are labeled *a* through *h*. The steps of the algorithm as it is applied to the graph of FIG. 3 are shown in FIGS. 4A and 4B. The leftmost column of FIGS. 4A and 4B enumerates the steps through which the algorithm passes. The numbers represented in this column refer to the different blocks of FIGS. 1A through 1D. The second column of FIGS. 4A and 4B gives the status of the trail thread list TT after the steps on the left have been accomplished. The third and fourth columns apply only to the "concat" procedure and indicate respectively the cyclic paths then being considered by the algorithm and the "cycle tail" of that cyclic path which is of interest. The fifth or last column indicates the cyclic paths found and identifies them as $C_1$, $C_2$, etc. As noted earlier, the trail thread list and the cyclic paths are represented by enumerating only the vertices. There is no confusion in doing this since there are no parallel arcs between any two of the vertices of the graph of FIG. 3 and therefore no need to distinguish between two arcs joining any two sets of vertices.

The algorithm begins by removing from the graph vertices *a* and *h* and the arcs *ab* and *gh* (lines 1 and 2 of FIG. 4A). The blocks of the algorithm of FIGS. 1A through 1D which are applied in doing this, as shown in the leftmost column of FIG. 4A, are blocks 2, 4, 6 and 8.

The algorithm next examines path *bcd*(*b*) of the graph of FIG. 3. (The parentheses around *b* in line 6 indicates that this vertex is reencountered by the algorithm but is not actually placed on the trial thread list TT.) When vertex *b* is reencountered the first cyclic path, $C_1$=*bcdb*, is formed as indicated in line 6 of FIG. 4A. The algorithm then, in effect, "backs up" and again examines the arcs originating on vertex *b* to determine if any exist which have not been on the trail thread list (block 20 of FIG. 1B). Cyclic paths $C_2$=*cdgefc* and Chd 3=*gefg* are then found in a manner similar to above.

After cyclic path $C_3$ is found, the algorithm again "backs up" and removes all but vertex *b* from the trail thread list (lines 12 through 16 of FIG. 4A). The arc from vertex *b* to vertex *e* is then considered by the algorithm (line 17) and upon determining that vertex *e* has once been on the trail thread list and has since been removed (block 26 of FIG. 1B), the "concat" part of the algorithm is entered.

Upon entering "concat," all cyclic paths which have previously been found and which contain the vertex then being considered (in this case vertex *e*) are placed in a work list. In the present example, this includes cyclic paths $C_2$ and $C_3$ of which $C_2$ is first considered as indicated in column 3, line 18 of FIG. 4A. The cycle tail of CP=$C_2$ is determined to be *fc* as indicated in line 18. The algorithm then proceeds as indicated in line 19 until it is determined that the end of $C_2$ (which is vertex *c*) is not on the trail thread list at which time, the variable "Recur" is set equal to 1, the path P (which in this case only includes vertex *e*), the list of examined cycle tails, and the work list is placed on top of the stack, the tail of $C_2$ with respect to *e* is added to the path P and the variable *v* is set equal to END(CP) = *c*. All this is in accordance with blocks 52 and 56 of FIG. 1D as indicated on line 19, column 1 of FIG. 4A. To recapitulate the status of the operation up to this point, the variable "Recur" = 1, the variable *v* = *c*, the stack contains a path P which consists of vertex *e*, a list of examined cycle tails which consists of cycle tail *fc*, and a work list which consists of $C_3$; the path P currently being considered is *efc* (this path, of course, is different from that which is placed on the stack). The algorithm then returns to block 34 of FIG. 1B and a new cyclic path $C_1$ and cycle tail *db* is chosen (line 20). Vertex *b* is then linked with path *efc* and cycle tail *db* to form a new cyclic path $C_4$ as set forth in line 21 of FIG. 4B. The remainder of the steps shown in FIG. 4B include unsuccessful attempts to concatenate various cycle tails to form new cyclic paths. As indicated on line 32, the "examine" part of the algorithm is reentered after which the process is terminated (line 33).

FIG. 5 shows a programming implementation of the present invention. The programming language of the program is the so-called SNOBOL 3 language as described in Farber, D. J., Griswold, R. E., and Polonsky, I. P., "The SNOBOL 3 Programming Language," Bell System Technical Journal, July-August, 1966. The program was implemented on an IBM 7094 computer. Those items preceded in the program by an asterisk are simply comments describing various aspects of the operation of the program. Implementation of the present invention in the program of FIG. 5 is apparent from an examination of FIG. 5 and is therefore not described further.

It is to be understood that the above described embodiment is only illustrative of the application of the principles of the present invention. Modifications in this embodiment may be devised by those skilled in the art without departing from the spirit and scope of the invention.

I claim:

1. A machine-implemented method, carried out by means of a data processing system that includes a storage unit, of determining the simple cycles of a finite directed graph comprising the machine steps of, searching various paths of said graph until a vertex of the graph is reencountered, placing in said storage unit a representation of the path followed from the initial encounter of said vertex to the reencounter, said path comprising a cyclic path, re-searching said path until a vertex is reencountered which has at least one arc which has not yet been searched, searching a path commencing with said arc, said searching including the previously defined searching, placing and re-searching steps, and concatenating terminal subpaths of the cyclic paths placed in said storage unit to thereby form additional cyclic paths.

2. A method as in claim 1 wherein said searching further comprises, placing in storage in a trail thread list in said storage unit representations of the vertices of the graph after they are searched, removing said vertices from said list as said vertices are re-searched, marking said vertices which are removed from said list, and terminating said searching after all vertices have been searched.

3. A method as in claim 2 wherein said concatenating further comprises selecting from said storage unit cyclic paths $CP_1$ which contain a vertex $v$ when the vertex $v$ is reencountered during said searching and is marked as no longer on the trail thread list, concatenating (a) the tails of such cyclic paths with respect to $v$ with (b) the tail of the trail thread list with respect to the end vertices of the cyclic paths $CP_1$ and with (c) $v$ and the arc joining $v$ to the trail thread list when the end vertices of the cyclic paths $CP_1$ are on the trail thread list, and placing said concatenated paths in said storage unit.

4. A method as in claim 3 wherein said concatenating further comprises selecting from said storage unit cyclic paths $CP_2$ which contain the end vertices of the cyclic paths $CP_1$ when said end vertices are not on the trial thread list, concatenating (a) the tail of the trail thread list with respect to the end vertex of $CP_2$ with (b) $v$ and the arc joining $v$ to the trial thread list, with (c) the tails of the cyclic paths $CP_1$ with respect to $v$, and with (d) the tails of the cyclic paths $CP_2$ with respect to the end vertices of the cyclic paths $CP_1$, repeating said previous selecting and concatenating steps for other cyclic paths in said storage unit until paths $CP_n$ are found whose end vertices are on the trail thread list, concatenating the tails of said cyclic paths $CP_n$ with respect to the end vertices of the last concatenated cyclic paths with said last concatenated paths and with the tail of the trial thread list with respect to the end vertices of $CP_n$ and placing said concatenated paths in said storage unit.

5. A method as in claim 4 further including the steps of, eliminating from said graph all vertices on which no arcs terminate and the arcs originating thereon, and eliminating from said graph all vertices on which no arcs originate and the arcs terminating thereon.

6. In a data processing system that includes a storage unit, a machine-implemented method, carried out by means of said system, of determining the simple cycles of a finite directed graph, the vertices and arcs of said graph being represented by a plurality of electrical signals stored in said unit, comprising the machine steps of:

a. removing from said storage unit those vertices of the graph on which no arcs originate or terminate and the arcs terminating and originating respectively thereon, b. selecting one of the remaining vertices in said storage unit, c. searching one of the paths emanating from said selected vertex, said searching including the steps of marking each vertex and arc encountered and placing in storage in a trial thread list in said storage unit a representation of each vertex encountered, the contents of said list representing a path from said selected vertex to the vertex currently being examined, d. placing in said storage unit in a cyclic path list a representation of any encountered vertex and of the tail of the trail thread path with respect to said vertex when said encountered vertex is marked and is in said storage unit in said trail thread list, e. concatenating terminal subpaths of cyclic paths in said storage unit in said cyclic path list, where at least one of said subpaths comprises a particular encountered vertex and when said particular vertex is marked and is absent from said trail thread list, to thereby form paths which originate at said particular vertex and terminate at vertices on said trial thread path, f. concatenating each such path formed in step (e) to the tails of said trail thread path with respect to the vertices on which the paths obtained in step (e) terminate to thereby obtain cyclic paths, g. placing the cyclic paths obtained in step (f) in said storage unit in said cyclic path list, h. reversing the direction of said searching to thereby re-search said trial thread list each vertex re-searched, i. searching a path originating on a reencountered branch vertex when said path originating on said branch vertex commences on an unmarked arc, said searching including steps (c) through (h), j. selecting an unmarked vertex as the starting point of a new trial thread path, if no branch vertices are encountered during said re-searching, and proceeding through steps (c) through (i) and k. terminating said method when all vertices have been searched.

7. In a data processing system, a machine-implemented method, carried out by means of said system, of determining the simple cycles of a directed graph, the vertices and arcs of said graph being represented by a plurality of stored electrical signals, comprising the machine steps of, a. examining a path of said graph, said examining including maintaining a record of the arcs and vertices examined, b. placing in storage in a cyclic path list the tail of said record with respect to a particular vertex plus said vertex when said vertex is present in said record and is reencountered during said examining, c. reexamining the arcs and vertices in said record and removing same therefrom until reencountering a vertex which contains arcs not previously examined, d. examining a path commencing with one of said unexamined arcs including steps (a) through (c), e. placing all cyclic paths which are in the cyclic path list and which contain a vertex *v* in storage in a work list, when said vertex *v* is reencountered during said examining and has once been but is no longer on said record, f. establishing a list where examined cycle tails can be stored, g. removing one cyclic path from the work list and determining its tail with respect to *v*, h. returning to step (g) if said cycle tail is in the list of examined cycle tails or contains no noninitial vertices, otherwise adding said cycle tail to said list of examined cycle tails, i. returning to step (g) if said cycle tail contains any vertices found on a path P which comprises a concatenation of previously examined cycle tails and the vertex *v*, j. concatenating (1) the tail of the record with respect to the end of said cycle tail with (2) the path P, and with (3) said cycle tail to form a cyclic path when said cycle tail end is present in said record, k. placing said cyclic path in the cyclic path list and returning to step (g), l. placing the path P, the list of examined cycle tails and the work list on top of a stack in storage, concatenating said cycle tail with the path P to form a new path P and setting said cycle tail end = *v* when said cycle tail end is not present in said record and returning to step (e), m. removing the top value of P, the top list of examined cycle tails and the top work list from the stack when the current work list is found to be empty and when the stack contains at least one value of P, n. returning to step (a) when the current work list is found to be empty and when the stack contains no values of P, and o. terminating the method when all vertices have been examined.

8. A method as in claim 7 further comprising the steps of, removing from said graph all vertices on which no arcs terminate and the arcs originating thereon, and removing from said graph all vertices on which no arcs originate and the arcs terminating thereon.